Nov. 3, 1931.  J. KOENIG  1,829,936
MILK TRUCK
Filed Feb. 24, 1930   3 Sheets-Sheet 1
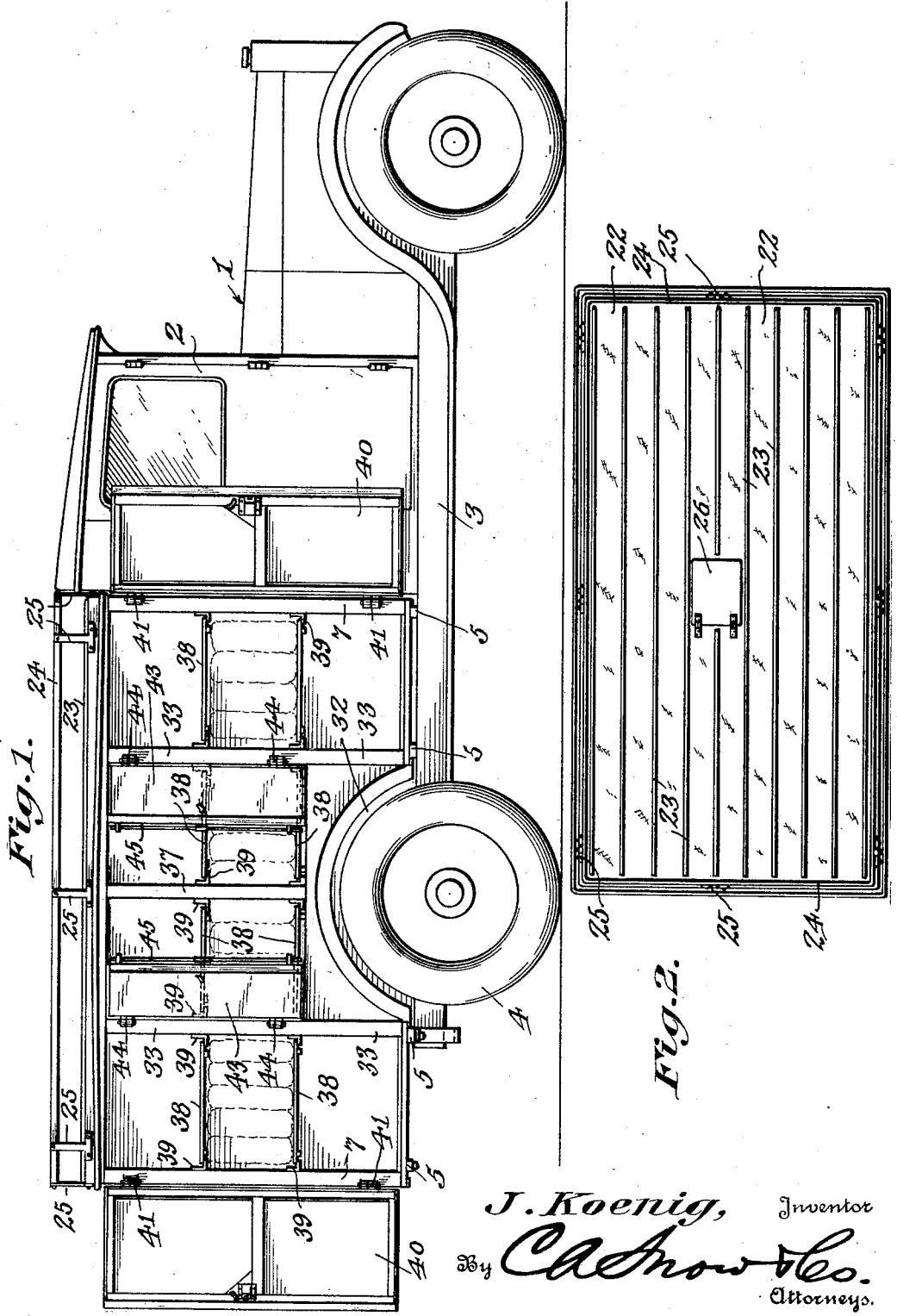

Nov. 3, 1931.　　　　　J. KOENIG　　　　　1,829,936
MILK TRUCK
Filed Feb. 24, 1930　　　3 Sheets-Sheet 2

J. Koenig Inventor
By C.A.Snow&Co.
Attorneys.

Nov. 3, 1931.  J. KOENIG  1,829,936
MILK TRUCK
Filed Feb. 24, 1930  3 Sheets-Sheet 3
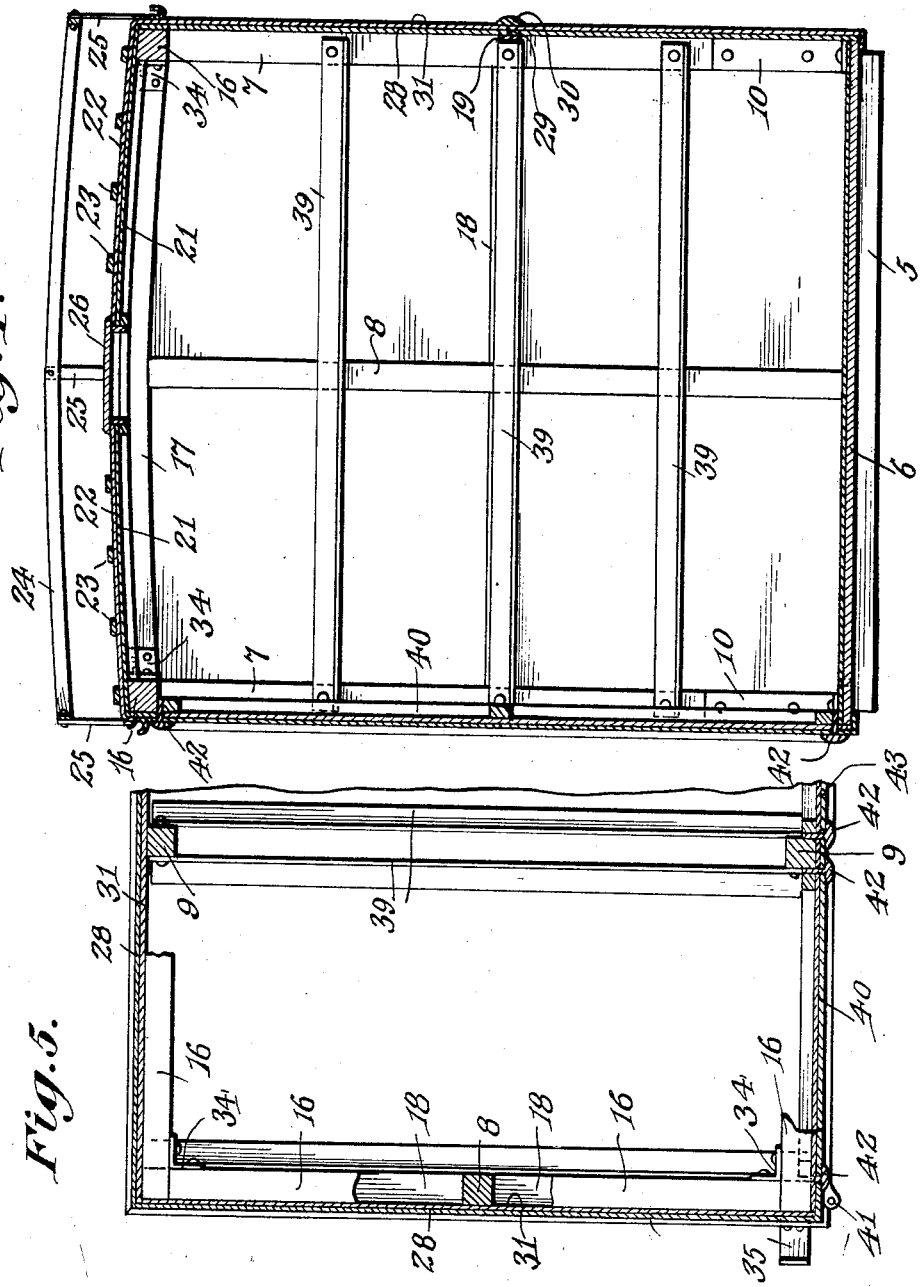
J. Koenig, INVENTOR.
BY CA Snow & Co.
ATTORNEYS.

Patented Nov. 3, 1931

1,829,936

UNITED STATES PATENT OFFICE

JOE KOENIG, OF QUINCY, ILLINOIS

MILK TRUCK

Application filed February 24, 1930. Serial No. 430,883.

This invention aims to provide a vehicle body, adapted to be mounted on a truck, to carry bread, milk, or any other merchandise, the body being strongly and inexpensively constructed, and it being possible to convert a truck into a carrier of great capacity at a small cost.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes may be made in the precise embodiment of the invention herein disclosed, within the scope of what is claimed, without departing from the spirit of the invention.

In the accompanying drawings:

Figure 1 shows in side elevation, a truck whereon the device forming the subject matter of this application has been mounted;

Figure 2 is a top plan of the body;

Figure 4 is a cross section on the line 4—4 of Figure 3;

Figure 5 is a fragmental horizontal section.

Figure 3:
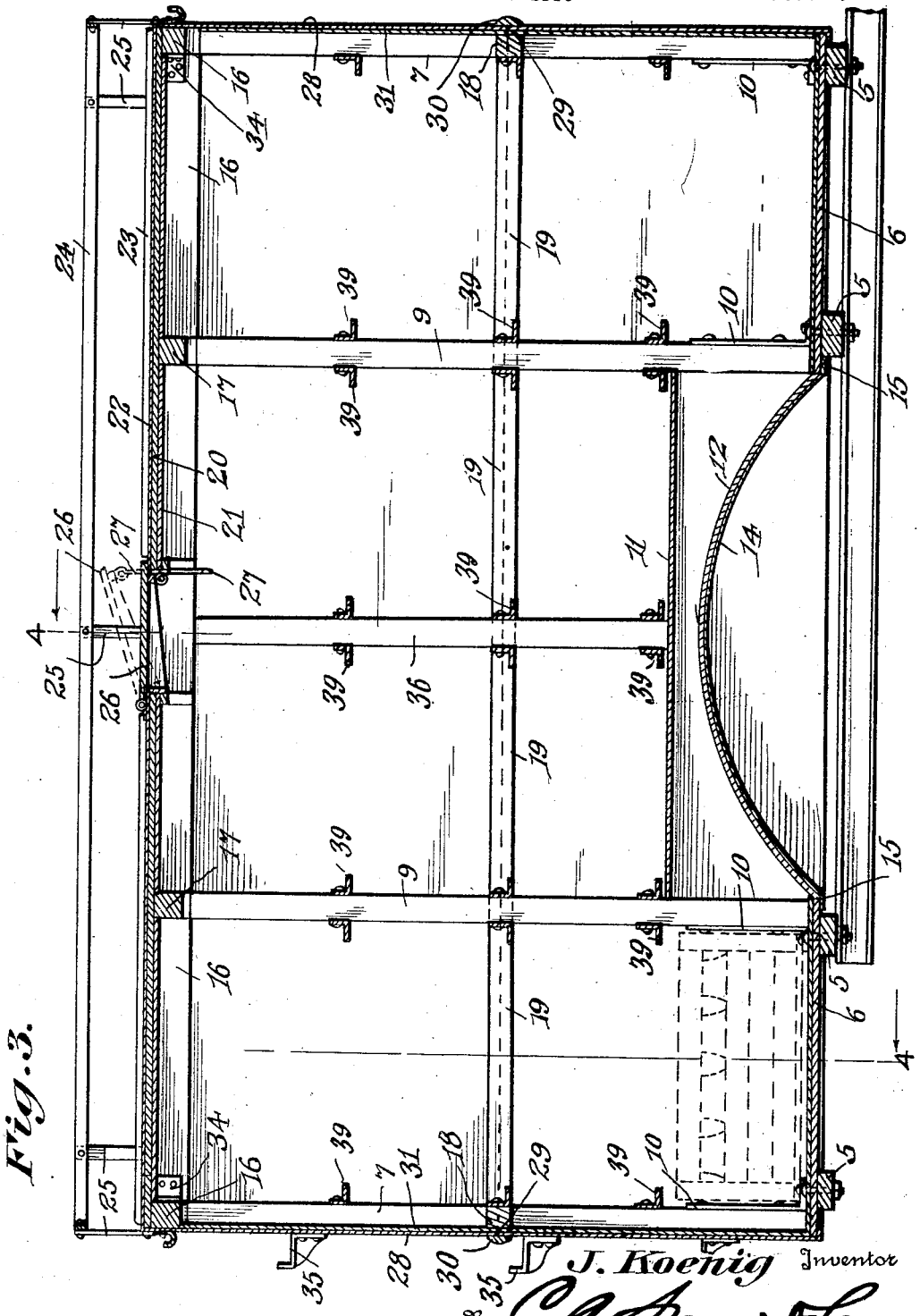
Figure 3 is a vertical longitudinal section of the body.

The numeral 1 marks an auto truck, comprising a driver's cab 2, a chassis 3, and rear wheels 4.

It is with such a truck, or a similar truck, that the vehicle body forming the subject matter of this application is intended to be used.

The vehicle body comprises a plurality of cross bars 5, most of which are attached to the chassis 3. The cross bars 5 carry floor sections 6, which may be made of wood, the floor sections 6 being provided with a metal lining 60 of galvanized material, if desired. The frame of the body comprises corner posts 7, and intermediate posts 8 located between the corner posts 7 at the front and at the back of the body. The frame includes side posts 9 located at the left hand side of the body, the term "left" presupposing that the observer is looking toward the front of the vehicle. The posts 7 and 8, as well as the posts 9, and other posts hereinafter mentioned, may be held on the floor of the body of the vehicle by angle brackets 10. On the right hand side of the body, as shown in Figure 1, there are side posts 33. A raised floor section 11 (Figure 3) extends across the vehicle from side to side and is mounted on the posts 9 and 33.

Below the raised floor section 11, at the sides of the vehicle, there are arches 12, which may be made of wood, with a metal lining 14, the ends 15 of which are extended underneath the floor sections 6, as shown in Figure 3 of the drawings.

A top frame 16 is held together by angle brackets 34 and is secured on the posts 7, 8, and 33. Rafters 17 extend across the top frame 16 from one side of the vehicle to the other. At the front of the vehicle body, and at the rear thereof, there are intermediate horizontal bars 18, preferably made of wood, and extended between the corner posts 7. On the left-hand side of the vehicle, there is an internal strip 19, which may be made of wood.

The top frame 16 and the rafters 17 carry a roof, which may be constructed as desired. The roof may include a layer 20 of wood, provided with a metal lining 21 and having an external cover 22 of canvas or any other of the flexible commercial materials which afford water-proof protection. On the cover 22 are mounted longitudinal ribs 23 which protect the roof cover from being worn or torn by articles carried on the roof. The articles on the roof are held thereon by a rail 24 supported by posts 25. The roof is supplied with a hinged hatch 26 which may be opened for ventilation, and be held open by a prop 27.

Access may be had to the roof by steps 35 secured to one of the corner posts 7.

The vehicle body abuts against the driver's cab 2. The front of the body, the left-hand side of the body, and the back of the body, are closed, and made up of upper and lower metal plates 28, between which there is a horizontal joint 29, covered by a molding 30, fastened to the horizontal members 18 at the front and at the back of the vehicle, and to the strip 19 at the left-hand side of the vehicle. The metal plates 28 may be provided with a metal lining 31 of galvanized or other construction. At the sides of the vehicle, the plates 28 are extended downwardly, as shown at 32, below the arch 12, to form a housing for the rear wheels 4, as will be understood readily when Figure 1 of the drawings is noted and compared with Figure 3.

At the left hand side of the vehicle, there is a central post 36, shown in Figure 3, and at the right hand side of the vehicle, there is a central post 37, shown in Figure 1 of the drawings. The posts 36 and 37 and the posts 9, as well as the posts 8 and 7, are supplied with angle brackets 39 on which removable shelves 38 may be mounted. The shelves are useful when bread, milk, or the like, is to be carried, but if the operator wishes to have a large space anywhere in the vehicle, he can remove the shelves 38 by sliding them out at the right hand side of the vehicle.

Doors 40 are hinged at 41 to the corner posts 7, at the right hand side of the vehicle, as shown in Figure 1, one of the doors 40 opening forwardly, and the other of the doors opening rearwardly. The doors may be made of frames, covered with any light, water-proof material, and the edges of the door frames carry T-shaped strips 42 (Figure 5), adapted to overlap the posts 33, and to overlap the frame work at the top and at the bottom of each door, if desired, thereby to close the cracks about the doors. Intermediate doors 43 are hinged at 44 to the posts 33, and may comprise sections, which are hingedly joined, as at 45, so that each door opens with a double fold. The doors 40 which are hinged at 41 extend downwardly to the floor sections 6, but the doors 43 which are hinged at 44, and are foldable at 45, extend downwardly only to the raised floor section 11.

The device forming the subject matter of this application is simple, but it affords a strong body, adapted for the transportation of merchandise, the construction being such that the material may be removed from the body, on the right-hand side, the body being otherwise closed, and there being no chance for merchandise to slide out or be stolen, from the left hand side of the body, from the front of the body, or the back of the body.

The device will withstand hard use, and will be found thoroughly effective for the purposes outlined in this specification.

Having thus described the invention, what is claimed is:—

A street delivery truck comprising a box-like body closed at its top, front and rear ends, and upon one side, the opposite side of the body being open from end to end, the body having transverse compartments which extend from the front end of the body to the rear end thereof, the open side of the body giving complete access to all of the transverse compartments at once, doors upon the open side of the body and forming closures for the transverse compartments, and slidable trays in the compartments and extending entirely across the body transversely; the truck having wheels held against rotation about vertical axes and the truck being of the automobile type, thereby causing the principal direction of advance of the truck to be always the same, thereby bringing the open side of the body to the curb, preventing the theft of merchandise from the opposite side and from the ends of the truck, and rendering it unnecessary for the driver to walk around the truck, into traffic, the trays giving access to the complete storage area of the body, from said single open side thereof.

In testimony that I claim the foregoing as my own, I have hereto affixed my signature.

JOE KOENIG.